US006179977B1

(12) United States Patent
Herbst

(10) Patent No.: US 6,179,977 B1
(45) Date of Patent: Jan. 30, 2001

(54) INSITU ELECTROCHEMICAL WATER TREATMENT PROCESS EQUIPMENT FOR PITS AND LAGOONS

(75) Inventor: Robert Herbst, Englewood, CO (US)

(73) Assignee: Current Water Technology, Inc, Denver, CO (US)

( * ) Notice: Under 35 U.S.C. 154(b), the term of this patent shall be extended for 0 days.

(21) Appl. No.: 09/209,852

(22) Filed: Dec. 11, 1998

(51) Int. Cl.[7] .............................. C02F 1/461
(52) U.S. Cl. .............................. 204/242; 204/269; 204/275.1
(58) Field of Search .............................. 205/742, 755; 204/242, 269, 275, 275.1

(56) References Cited

U.S. PATENT DOCUMENTS 4,337,136 * 6/1982 Dahlgren .............................. 204/242
5,085,753 * 2/1992 Sherman .............................. 205/755
5,256,263 * 10/1993 Kanai .............................. 205/755

* cited by examiner

*Primary Examiner*—Arun S. Phasge
(74) *Attorney, Agent, or Firm*—Edwin H. Crabtree; Ramon L. Pizarro; Donald W. Margolis

(57) ABSTRACT

Insitu process equipment for the electrochemical treatment of contaminated water in a pit or lagoon such as an oil drilling reserve pit. The insitu process equipment uses a minimum of equipment for removing both suspended and dissolved solids in the water and allowing the treated water to be decanted from the pit or lagoon for reuse or discharge. The process equipment includes a floatation device in the form of a plurality of lightweight foam filled barrels rotatably mounted on drum axles. The drum axles are attached to an elongated barrel frame. A pair of electrode assemblies with a plurality of electrodes are attached to opposite sides of the barrel frame. The electrode assemblies are pivotly mounted on the barrel frame for lowering the electrodes below the water level when the process is in operation. An electrode cable guide is mounted on top of the barrel frame and the barrels for holding electrode cables. One end of the electrode cables are attached to opposite ends of the electrode assemblies. The other end of the electrode cables is attached to a power supply, such as a generator, resting on the shore and next to the pit or lagoon. The power supply provides direct current via the cables to the electrodes with the polarity of the current cycle reversed periodically depending on the types of water contaminates being treated. When the cycle is reversed, the contaminants gathered on the electrodes typically fall to the bottom of the pit as precipitated solids.

17 Claims, 3 Drawing Sheets

GENERATOR
18 10 20 16 22 24 26 16 24 22 16 24 26 12 20 30 28 28 14 14 32 32 32 32

INSITU ELECTROCHEMICAL WATER TREATMENT PROCESS EQUIPMENT FOR PITS AND LAGOONS

BACKGROUND OF THE INVENTION (a) Field of the Invention

This invention relates to process equipment and method of treating contaminated water and wastewater and more particularly, but not by way of limitation, to insitu process equipment using an electrochemical treatment of the water for dropping out various types of contaminates such as metals and other compounds held in suspension.

(b) Discussion of Prior Art

In U.S. Pat. Nos. 4,293,400 and 4,378,276 to Liggett, an apparatus with a positively charged aluminum electrode and a negatively charged tubular steel electrode are disclosed for the electrolytic treatment of water. In U.S. Pat. No. 5,587,057 to Metzler et al., an electrocoagulation process is described having electrolytic treaters for treating a highly conductive liquid media.

In U.S. Pat. No. 4,872,959 to Herbst et al., U.S. Pat. Nos. 5,043,050 and 5,423,962 to Herbst, the inventor of the subject invention, Robert J. Herbst describes different types of improved electrolytic systems for treating aqueous solutions using conductive conduits and precipitating various organic and inorganic materials suspended in the solution.

None of the above mentioned prior art electrolytic treatment systems of liquids disclose or teach the use of the subject electrochemical process equipment and method of treating contaminated water insitu in a pit or lagoon such as a oil drilling reserve pit.

SUMMARY OF THE INVENTION

In view of the foregoing, it is a primary object of the invention to treat contaminated water and wastewater for separating various types of contaminates from the water in a pit or lagoon.

Another object of the subject process equipment is to treat the contaminated water insitu and without having to pump the contaminated water from the pit or lagoon.

Still another object of the insitu process equipment is to use a minimum of equipment for removing both suspended and dissolved solids in the water and allow the treated water to be decanted from the pit or lagoon for reuse or discharge.

Yet another object of the process equipment is to remove various contaminates from the water such as suspended metals, hydrocarbons and gases. Also, bacteria, viruses, cysts and algae can be destroyed electrochemically and removed via precipitation.

The process equipment includes a floatation device in the form of a plurality of lightweight foam filled barrels rotatably mounted on drum axles. The drum axles are attached to an elongated barrel frame. A pair of electrode assemblies with a plurality of electrodes are attached to opposite sides of the barrel frame. The electrode assemblies are pivotly mounted on the barrel frame for lowering the electrodes below the water level when the process is in operation. An electrode cable guide is mounted on top of the barrel frame and the barrels for holding electrode cables. One end of the electrode cables is attached to opposite ends of the electrode assemblies. The other end of the electrode cables is attached to a power supply, such as a generator, resting on the shore and next to the pit or lagoon. The power supply provides direct current via the cables to the electrodes with the polarity of the current cycle reversed periodically depending on the types of water contaminates being treated. When the cycle is reversed, the contaminants gathered on the electrodes typically fall to the bottom of the pit as precipitated solids.

These and other objects of the present invention will become apparent to those familiar with the electrochemical or electrocoagulation treatment of contaminated water when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
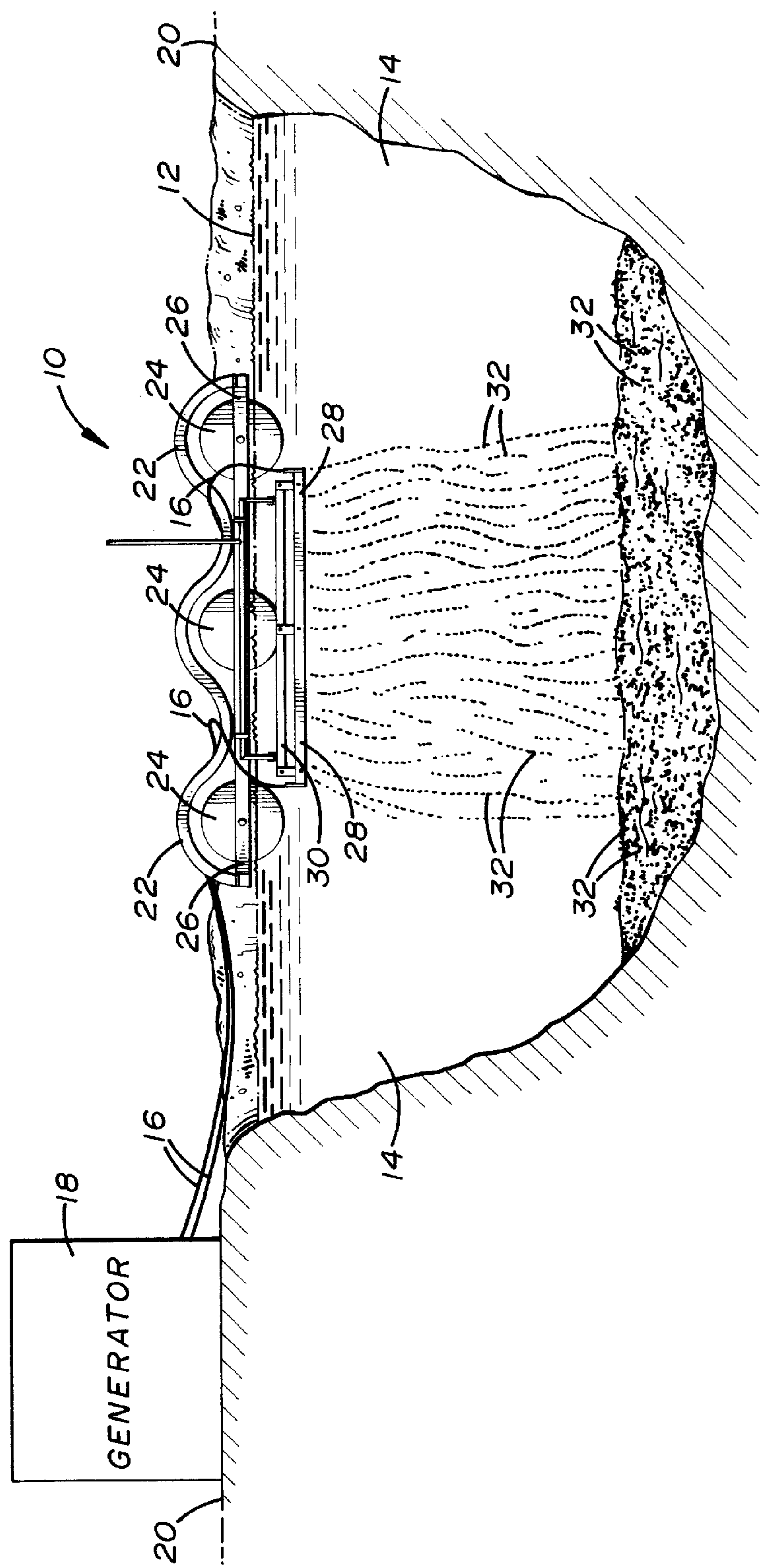
FIG. 1 is a side view of the subject insitu process equipment shown floating in a pit or lagoon with electrode cables extending form a floating barrel frame and connected to a power supply such as a generator resting on the shore of pit.

In FIG. 1, a side view of the equipment used in practicing the subject invention is shown. The equipment is designated by general reference numeral 10. The equipment 10 is shown floating on a surface 12 of contaminated water in a pit 14 or lagoon. While the pit 14 is shown, it should be kept in mind that the process and method can be practiced in various contained bodies of water such as ponds, ditches, water channels, water tanks and the like.

Figure 2:
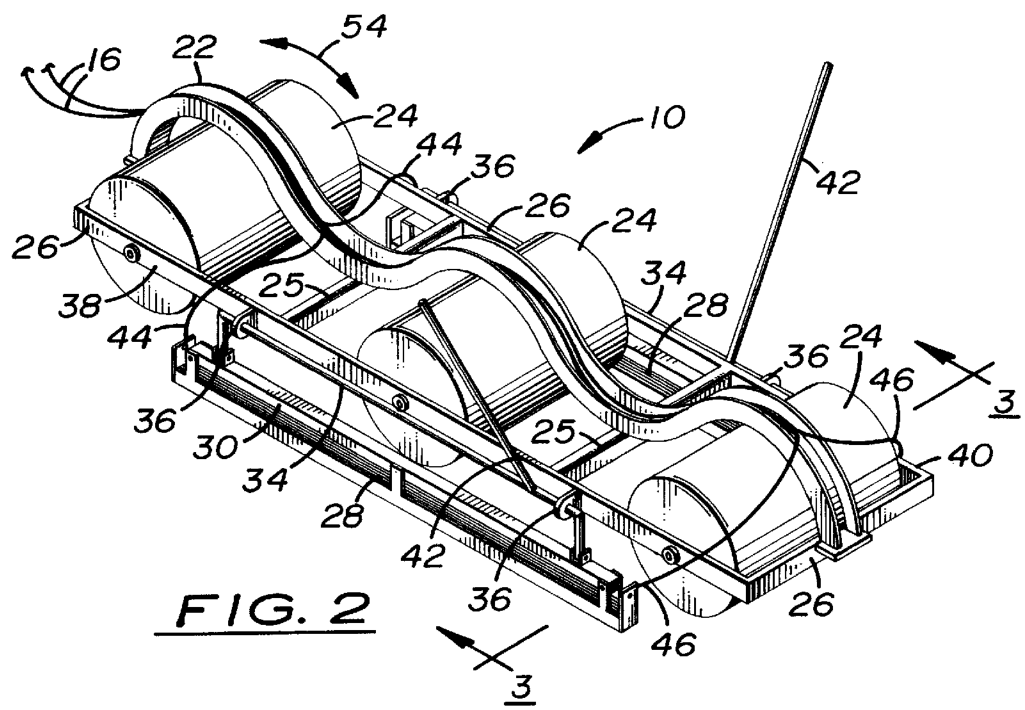
FIG. 2 is a perspective view of the subject insitu process equipment for treating contaminated water in a pit or lagoon. Broadly the equipment includes a lightweight foam filled barrels mounted on the floating barrel frame. A pair of electrode assemblies with electrodes are pivotly mounted opposite sides of the barrel frame. The electrode cables are attached to the electrodes and the generator.

Broadly, the equipment 10 includes a plurality of electrode cables 16 connected to a power supply such as a generator 18 resting on a shore 20 surrounding the pit 14. The electrode cables 16 are received on top of a serpentine electrode cable guide 22 and guided thereon. The cable guide is disposed above the top of a plurality of lightweight foam filled barrels 24 and attached cross members 25 which are part of an elongated barrel frame 26. The cross members 25 are shown in FIG. 2. The barrels 24 are rotatably mounted the elongated barrel frame 26. While the barrels 24 and the barrel frame 26 are shown in the drawings, it can be appreciated that various types of floatation means can be used equally well without departing from the spirit and scope of the subject water treatment process. The opposite ends of the electrode cables 16 are connected to a plurality of electrodes 28 which are mounted on a pair of electrode assemblies 30. The electrode assemblies 30 are pivotly mounted along opposite sides of the elongated barrel frame 26.

In this drawing, the equipment 10 is shown in operation with the generator 18 providing direct current via the electrode cables 16 to the electrodes 28. The polarity of the current cycle to the electrodes 28 is reversed periodically depending on the types of water contaminates being treated. When the cycle is reversed, the contaminants gathered, shown as black dots 32 or specks, on the electrodes 28 and then typically fall to the bottom of the pit 12 as precipitated solids.

It should be noted that the preferred power is direct current, however, other forms of electricity might be employed. The polarity reversing cycle will be dependent on the fluid being treated. The longer the cycle without plugging the electrodes 28 the better, but reality dictates shorter cycles of 1 to 5 minutes or less to prevent the plating of contaminates on the electrodes 28.

In FIG. 2, a perspective view of the subject insitu process equipment 10 is shown for treating the contaminated water in the pit 14. In this view, the lightweight foam filled barrels 24 are shown mounted on the floating barrel frame 26 with the cable guide 22 received on top of the barrels 24. The pair of electrode assemblies 30 with electrodes 28 are attached to an elongated inverted "U" shaped suspension arm 34. The two suspension arms 34 are pivotly mounted on a pair of frame brackets 36 which are attached to sides 38 and 40 of the barrel frame 26. A pair of pivot handles 42 are attached to the suspension arms 34 and extend upwardly therefrom. The pivot handles 42 provide a means for raising the two electrode assemblies 30 upwardly and above the bottom of the barrels 24 when the equipment 10 is moved on to the shore 20 for servicing the equipment 10 or rolling onto a trailer for transporting to another water treatment site. In the drawings, the pivot handles 42 are shown having lowered the electrode assemblies 30 below the water surface 12 with the electrodes 28 in position for treating the contaminated water.

Also in FIG. 2, the electrode cables 16 are shown received in the cable guide 22 and having a pair of positive leads 44 connected to one end of the electrodes 28 and a pair of negative leads 46 connected to an opposite end of the electrodes 28. Obviously, when the generator 18 changes polarity to the cables 16, the positive and negative charges will reverse to the leads 46 and 48.

Figure 3:
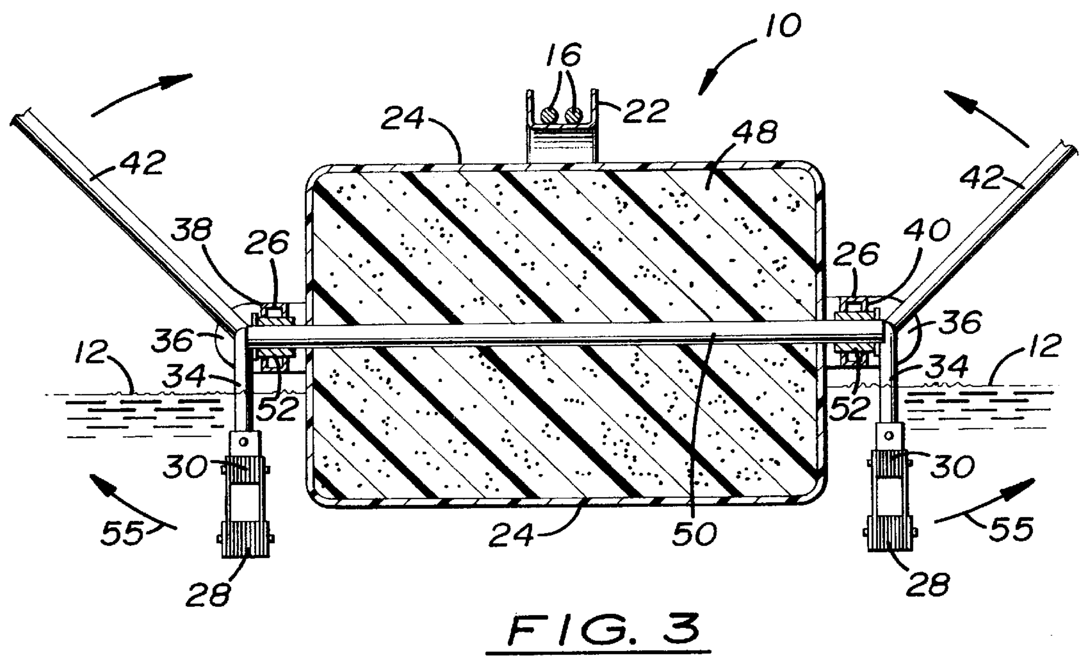
FIG. 3 is a sectional view of one of the foam filled barrels and barrel frame taken along lines 3—3 shown in FIG. 2.

In FIG. 3, a sectional view of one of the barrels 24 and barrel frame 26 is shown taken along lines 3—3 shown in FIG. 2. The barrels 24 may be made of hard plastic or other types of barrel material and filled with foam 48 for increased buoyancy. A barrel axle 50 is disposed through the center of the barrel 24 with the ends of the axle 50 mounted on wheel bearings 52 attached to the sides 38 and 40 of the barrel frame 26. In this manner, the barrels 24 are free to rotate, as indicated by arrow 54 in FIG. 2, on the barrel frame 26 and moving the equipment 10 when on a land surface. Also in this drawing are arrows 55 which indicate the raising of the electrode assemblies 30 above the water surface 12 when using the pivot handles 42.

Figure 4:
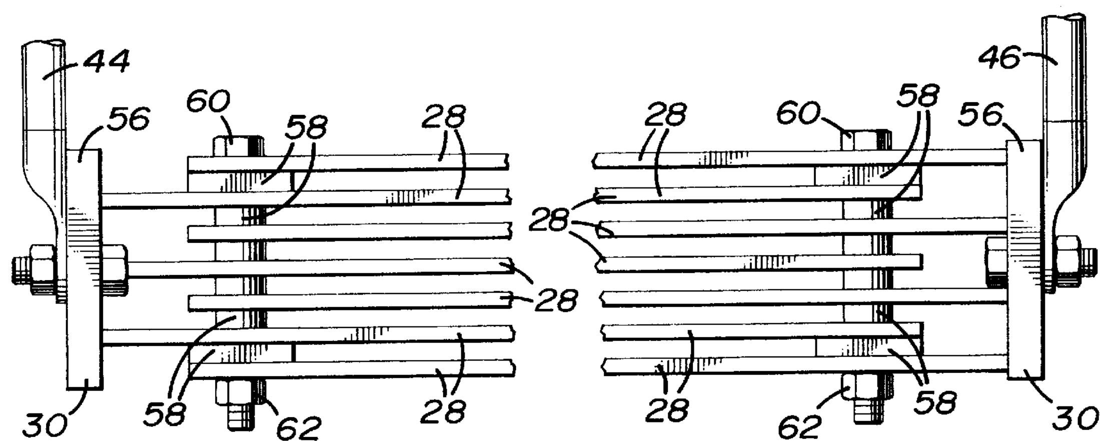
FIG. 4 is a top view of a plurality of electrodes mounted on one of the electrode assemblies.

In FIG. 4, a top cut away view of a portion of one of the electrode assemblies 30 is shown. The electrode assemblies 30 include seven electrodes 28 in the form of plates. The plates are typically 3 inches high, ⅛inch wide and 10 feet long. Depending on the application and the solutions being treated the plates can obviously vary in size. The electrodes 28 are attached at opposite ends to a pair of electrode bars 56. The electrodes 28 are held apart from each other using insulation spacers 58 mounted on a pair of threaded bolts 60 with nuts 62. In this drawing, an end of the positive electrode lead 44 is shown bolted on one electrode bar 56 with an end of the negative electrode lead 46 bolted on the other electrode bar 56.

When reversing the polarity to the leads 44 and 46, the longer the cycle without plugging the electrodes 28 the better. But reality dictates shorter cycles of 1 to 5 minutes or less to prevent the plating of contaminates on the electrodes. As the electrical cycle is reversed, the plate scale is expelled from the electrodes and typically the contaminates 32 fall to the bottom of the pit 16 as shown in FIG. 1.

Some contaminates are of less specific gravity than water and will tend to float to the surface of the pit or lagoon being treated. In this case, a water surface weir with a floating perimeter is used to prevent the foam and floating material from getting into the treated water being collected through the surface weir. A pump is used to draw the water through the surface weir for removal or circulation. The surface weir and pump are not shown in the drawings.

It should be mentioned, the electrical current between the electrodes 28 cause a myriad of electrochemical phenomena to occur. For example, colloidal particles are flooded with electrons that cause them to become more dense and electronegative. A positive metallic ion that is sacrificed from the electrodes, becomes an attractive nucleus to the electronegative colloidal particles. This forms a dense precipitate, which then tends to settle to the bottom of the pit or lagoon. Also, many other electrochemical phenomena can occur due to the general complex components found in wastewater.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. Insitu process equipment for the electrochemical treatment of contaminated water in a contained body of water, the equipment comprising:

a floatation device rotatably mounted on a frame, said floatation device adapted for floating on the surface of the contaminated water and for rolling on shore when servicing the equipment;

a first electrode assembly with a plurality of electrodes, said first electrode assembly attached to and suspended from said frame;

a first electrode cable and a second electrode cable, said first and second electrode cables received on said frame, one end of said first electrode cable attached to one end of said first electrode assembly, one end of said second electrode cable attached to an opposite end of said first electrode assembly; and an electrical power supply connected to an opposite end of said first and second electrode cables for providing an electrical power source to said electrodes.

2. The equipment as described in claim 1 wherein said electrical power supply provides a direct current electrical power source to said first and second electrode cables.

3. The equipment as described in claim 2 wherein said electrical power supply provides for reversing periodically the polarity of the direct current electrical power source to said first and second electrode cables.

4. The equipment as described in claim 1 wherein said floatation device is in the form of a plurality of lightweight foam filled barrels mounted on a barrel frame.

5. The equipment as described in claim 1 further including a second electrode assembly with a plurality of electrodes, said second electrode assembly attached and suspended from said frame, and including a third electrode cable and a fourth electrode cable, said third and fourth electrode cables received on said frame, one end of said third electrode cable attached to one end of said second electrode assembly, one end of said fourth electrode cable attached to an opposite end of said second electrode assembly, said electrical power supply connected to an opposite end of said third and fourth electrode cables for providing an electrical power source to said electrodes.

6. Insitu process equipment for the electrochemical treatment of contaminated water in a contained body of water, the equipment comprising:

a plurality of lightweight foam filled barrels mounted on a barrel frame, said barrels rotatably mounted on said barrel frame, said barrels adapted for floating on the surface of the contaminated water and for rolling on shore when servicing the equipment;

a first electrode assembly with a plurality of electrodes, said first electrode assembly attached to and suspended from said barrel frame;

a serpentine shaped electrode cable guide mounted on said barrel frame for holding a first electrode cable and a second electrode cable above a top of said barrels, one end of said first electrode cable attached to one end of said electrode assembly, one end of said second electrode cable attached to an opposite end of said electrode assembly; and an electrical power supply connected to an opposite end of said first and second electrode cables for providing an electrical power source to said electrodes.

7. The equipment as described in claim 6 wherein said electrical power supply provides a direct current electrical power source to said first and second electrode cables.

8. The equipment as described in claim 6 wherein said electrical power supply provides for reversing periodically the polarity of the direct current electrical power source to said electrode cables.

9. The equipment as described in claim 6 further including first pivot means attached to said first electrode assembly and attached to said barrel frame, said first pivot means adapted for raising said first electrode assembly above the contaminated water and lowering said first electrode assembly into the contaminated water.

10. The equipment as described in claim 6 further including a second electrode assembly with a plurality of electrodes, said second electrode assembly pivotally mounted on one side of said barrel frame, said first electrode assembly pivotally mounted on an opposite side of said barrel frame.

11. The equipment as described in claim 10 further including second pivot means attached to said second electrode assembly and attached to said barrel frame, said second pivot means adapted for raising said second electrode assembly above the contaminated water and lowering said second electrode assembly into the contaminated water.

12. The equipment as described in claim 10 further including a third electrode cable and a fourth electrode cable, one end of said third electrode cable attached to one end of said second electrode assembly, one end of said fourth electrode cable attached to an opposite end of said second electrode assembly, said electrical power supply connected to an opposite end of said third and fourth electrode cables for providing an electrical power source to said electrodes.

13. Insitu process equipment for the electrochemical treatment of contaminated water in a contained body of water, the equipment comprising:

a floatation device mounted on a frame, said floatation device adapted for floating on the surface of the contaminated water;

a first electrode assembly with a plurality of electrodes;

first pivot means attached to said first electrode assembly and said frame, said first pivot means for raising said first electrode assembly on said frame above the contaminated water and for lowering said first electrode assembly on said frame into the contaminated water;

a first electrode cable and a second electrode cable, said first and second electrode cables received on said frame, one end of said first electrode cable attached to one end of said first electrode assembly, one end of said second electrode cable attached to an opposite end of said first electrode assembly; and an electrical power supply connected to an opposite end of said first and second electrode cables for providing an electrical power source to said electrodes.

14. The equipment as described in claim 13 further including a second electrode assembly with a plurality of electrodes and second pivot means attached to said second electrode assembly and said frame, said second pivot means for raising said second electrode assembly on said frame above the contaminated water and for lowering said second electrode assembly on said frame into the contaminated water.

15. The equipment as described in claim 14 further including a third electrode cable and a fourth electrode cable, one end of said third electrode cable attached to one end of said second electrode assembly, one end of said fourth electrode cable attached to an opposite end of said second electrode assembly.

16. The equipment as described in claim 13 wherein said electrical power supply provides a direct current electrical power source to said first and second electrode cables.

17. The equipment as described in claim 13 wherein said electrical power supply provides for reversing periodically the polarity of the direct current electrical power source to said first and second electrode cables.

* * * * *